US009465236B2

(12) United States Patent
Pugh et al.

(10) Patent No.: US 9,465,236 B2
(45) Date of Patent: Oct. 11, 2016

(54) OPHTHALMIC DEVICES INCORPORATING PHOTONIC ELEMENTS

(71) Applicant: Johnson & Johnson Vision Care, Inc., Jacksonville, FL (US)

(72) Inventors: Randall B. Pugh, Jacksonville, FL (US); Frederick A. Flitsch, New Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 361 days.

(21) Appl. No.: 13/833,877

(22) Filed: Mar. 15, 2013

(65) Prior Publication Data

US 2014/0268014 A1 Sep. 18, 2014

(51) Int. Cl.
| G02C 1/00 | (2006.01) |
| G02C 11/00 | (2006.01) |
| G02C 7/04 | (2006.01) |
| G02B 27/01 | (2006.01) |

(52) U.S. Cl.
CPC ............ *G02C 11/10* (2013.01); *G02B 27/017* (2013.01); *G02C 7/04* (2013.01)

(58) Field of Classification Search
CPC ........ G02C 7/04; G02C 7/041; G02C 7/049; G02C 11/04; G02C 11/10; A61B 3/0008; A61B 3/12; A61B 3/125
USPC ............... 351/158, 159.02, 159.03, 206, 221
See application file for complete search history.

(56) References Cited

U.S. PATENT DOCUMENTS

| 5,682,210 A | 10/1997 | Weirich |
| 2006/0033879 A1* | 2/2006 | Covannon et al. ........... 351/221 |
| 2008/0002262 A1 | 1/2008 | Chirieleison |
| 2008/0031294 A1* | 2/2008 | Krishnamoorthy . H01S 5/02453 372/34 |
| 2009/0189830 A1 | 7/2009 | Deering et al. |
| 2010/0110532 A1 | 5/2010 | Takemoto et al. |
| 2012/0199995 A1* | 8/2012 | Pugh et al. .................. 264/1.36 |

FOREIGN PATENT DOCUMENTS

| JP | 2005311823 A | 11/2005 |
| WO | WO 2008109867 A2 | 9/2008 |

OTHER PUBLICATIONS

Y Jie Sun et al: "Large-scale nanophotonic 4.8-15 phased array". Nature. vol. 493. No. 7431. Jan. 9, 2013. pp. 195-199. XP055124083. ISSN: 0028-0836. DOI: 10.1038/nature11727.
EP Search Report EP 14 16 0132 Dated Jun. 23, 2014.
EP Search Report EP 14 16 0132 Dated Sep. 26, 2014 Date of Completion Sep. 19, 2014.

* cited by examiner

*Primary Examiner* — Huy K Mai

(57) ABSTRACT

This invention describes Ophthalmic Devices with media inserts that have photonic elements upon or within them. In some embodiments passive ophthalmic devices of various kinds may be formed. Methods and devices for active ophthalmic devices based on photonic based projection systems may also be formed.

15 Claims, 9 Drawing Sheets

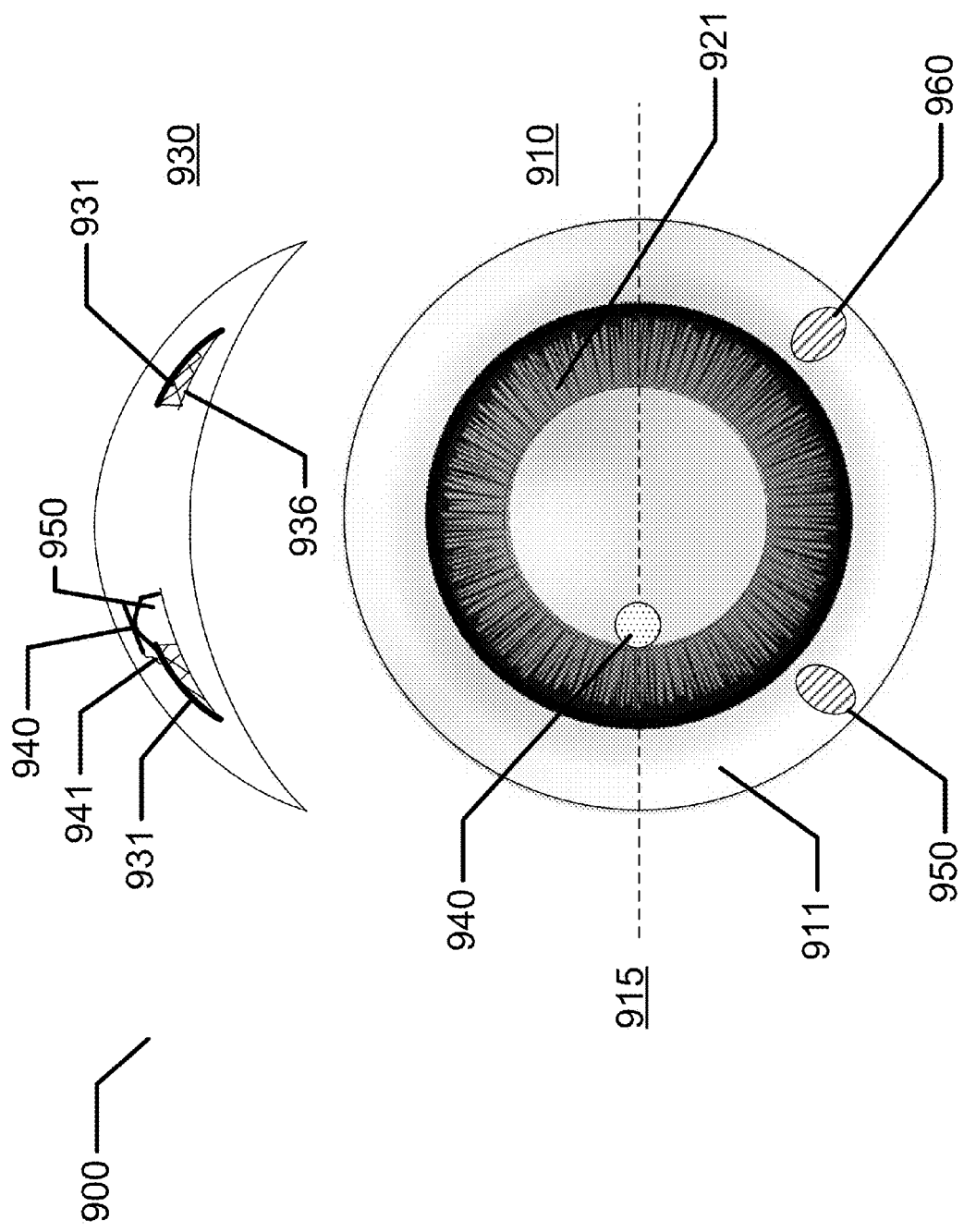

OPHTHALMIC DEVICES INCORPORATING PHOTONIC ELEMENTS

FIELD OF USE

This invention describes Ophthalmic Devices that have Photonic Emitters upon or within them.

BACKGROUND

Traditionally, an ophthalmic device, such as a contact lens, an intraocular lens, or a punctal plug, included a biocompatible device with a corrective, cosmetic, or therapeutic quality. A contact lens, for example, may provide one or more of vision correcting functionality, cosmetic enhancement, and therapeutic effects. Each function is provided by a physical characteristic of the lens. A design incorporating a refractive quality into a lens may provide a vision corrective function. A pigment incorporated into the lens may provide a cosmetic enhancement. An active agent incorporated into a lens may provide a therapeutic functionality. Such physical characteristics are accomplished without the lens entering into an energized state. A punctal plug has traditionally been a passive device.

Novel ophthalmic devices based on energized and non-energized ophthalmic inserts have recently been described. These devices may use the energization function to power active optical components.

Recently, it has been demonstrated that nanoscale photonic elements may be useful in projecting photons from arrays of said elements. In both the near field and the far field perspectives of the photon projection, images may be obtained.

It may be useful to define ophthalmic devices to result from the incorporation of nanoscale photonic elements or arrays of such elements into said ophthalmic devices.

SUMMARY

Accordingly, the present invention includes an encapsulated Media Insert with Photonic Emitters that may be included into an energized Ophthalmic Device, and in some embodiments, specifically, a contact lens. The Photonic Emitters may provide light patterns or dynamic images from light patterns that may be used to convey information or data through an ophthalmic device to a user's retina in the form of the light patterns. In some embodiments, an energized Ophthalmic Device with a projection system comprising an array of Photonic Emitters where the image is filtered by a corresponding array of light modulating elements and projected through an electro-optic lens system is provided.

The present invention therefore includes disclosure of Ophthalmic devices which contain Photonic Emitters. The Ophthalmic devices may additionally include light sources which provide light to the Photonic Emitters. The novel Ophthalmic devices may additionally include electronic components that control and pass energy in the form of electrical potential to the light source. The electronic components may receive their energy from energization elements. In some embodiments, these components may all be assembled in an Ophthalmic device that may have a size and shape that is consistent with the Ophthalmic device occupying a position that is between a user's eye surface and a that eye's respective eye lid.

In some embodiments, the Photonic Emitters of such a device may be formed in a semiconducting material which may include or be made of silicon. Designs of the Photonic Emitters may have numerous aspects useful to their function. For example, the incorporation of resistive heating elements in their structure may allow for Photonic Emitter elements that influence the phase characteristics of light that pass through them. Other design elements, such as the length and separation of portions of the Photonic Emitter relative to light pipes that provide photons to the system, may be important.

The light sources that provide light to the Photonic Emitters and to the systems formed from combinations of these Photonic Emitters may be of different types. Some embodiments may be comprised of light emitting diodes for the light source. Other embodiments may comprise solid state laser elements as at least part of the light source. In some embodiments, the light source may be comprised of combinations of multiple light sources. The combination may be of Led and Laser sources or of individual sources of each type, where the individual sources may have different wavelength characteristics. For example, a solid-state light emitting element of either a diode type or a laser type may be one of at least the following color choices: Red, Orange, Yellow, Green, or Blue to mention some examples. In some embodiments, the light source may be formed in or upon the same substrate as the Photonic Emitter in a processing flow that my in one flow process light sources, electronic components and optical components. In other embodiments, separate light source components may be attached to the systems comprising Photonic Emitters.

The Ophthalmic device may include elements and systems of elements that act on the intensity of light emitted from a Photonic Emitter before it leaves the ophthalmic device. In some embodiments, each Photonic Emitter may comprise a pixel element, and each pixel element may also have a Light Modulating Element. A combination of these light modulating elements may be considered a light modulating system. When each of the light modulating elements is paired with a Photonic Emitter or a repeating combination of Photonic Emitters, the system may be considered as a Pixel Based Light Modulating System.

The Light Modulating Elements may function by interposing a material that filters light into the light path arising from the Photonic Emitters. In some embodiments, this function may be performed using Electro-Wetting on Dielectric (EWOD) based phenomena, where a surface region within the device may be constructed to have a nascent surface free energy. The EWOD device may then also have a combination of immiscible liquids or fluids that interact differently with the surface region of defined nascent surface free energy. A controlled application of an electro-potential across the surface region may be useful in altering its surface free energy or its effective surface free energy and thus interact with the combination of immiscible fluids differently. If at least one of the fluids absorbs or scatters the light emanating from the Photonic Emitter and the other does not, by changing which fluids are or are not in the light path, a control or modulation of the light intensity may be obtained and this may be called light modulation.

An Ophthalmic device may be formed by incorporating a projection system along with energization elements, control circuitry, communication circuitry and data processing circuitry into a single entity. The projection system may be made up of a subsystem comprising at least a Photonic Emitter element, a light source, a light modulating element and a lens element. The projection systems may also be made up of subsystems that comprise combinations of Photonic Emitter elements and an associated Pixel Based Light Modulating Elements.

An ophthalmic device, which incorporates a projection system, may display data or information in various forms. The display may project text-based information. Similarly, the display may project images. The images may be of the form of digital images comprised of multiple pixels of image data projected. The images may be displayed as a monochrome display or alternatively have various degrees of color. By altering the display on a time scale, the projection system may display data in the form of video of various formats.

The exemplary display of an ophthalmic display comprising a system of Photonic Emitters may incorporate lenses as part of the ophthalmic device. These lenses may act on the image formed from the system of photonic emitters and focus that image in various ways onto the user's retina. The far field image created by the array of photonic emitters or the near field image created by the array of photonic emitters may be focused by the lens system. In some embodiments, the lens system may comprise multiple lens subsystems. In some embodiments, the lens subsystems may have elements that have a fixed focal characteristic or a fixed focal length. In other embodiments, the lens subsystem may include at least a first variable focal length lens. An example of such a variable focal length lens may include a meniscus-based lens that may also function utilizing the EWOD effect. Complex variable focal length lens may also be formed with multiple electrode regions that may be useful to move the focal point characteristic of the lens both from a focal length perspective but also from a translational perspective that may effectively vary where the image is projected. In some cases, the image may be projected by the system through a user's eye and upon a user's retina. When projected on the user's retina, the size of the image formed by the extent of the imaged photonic elements may be less than a square centimeter in size. In other embodiments the size may be less than or approximately equal to a square millimeter in size.

DESCRIPTION OF THE DRAWINGS

FIG. 9. Illustrates an exemplary energized ophthalmic device for a projection system comprising photonic arrays, light phase or intensity modulation arrays and lens systems that may be useful for implementing aspects of the art herein.

DETAILED DESCRIPTION OF THE INVENTION

Figure 1:
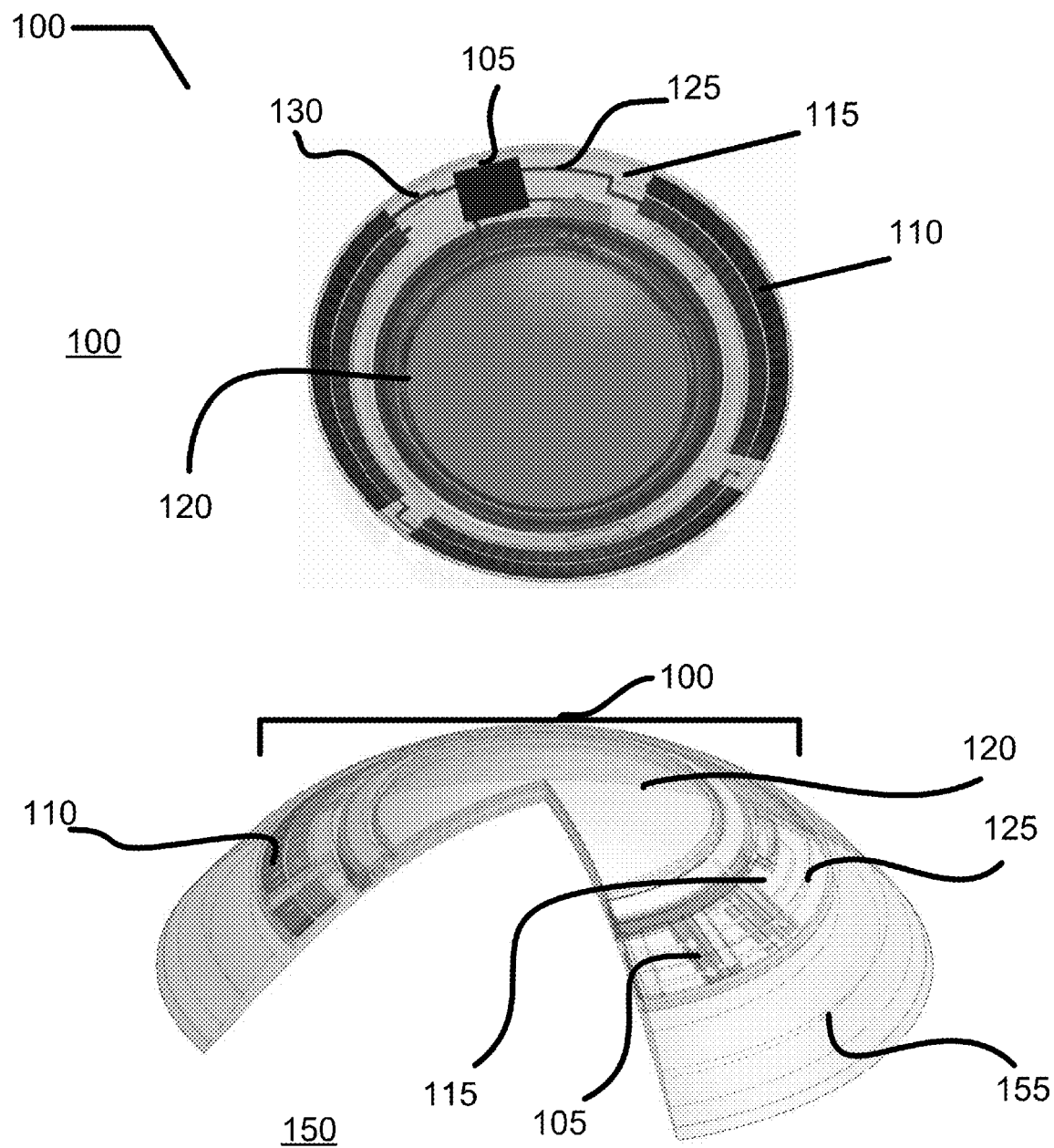
FIG. 1 illustrates an exemplary embodiment of a Media Insert for an energized ophthalmic device and an exemplary embodiment of an energized Ophthalmic Device.

The present invention relates to an ophthalmic device having Photonic Emitters that may project light patterns in the environment of the eye. In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

Glossary

In this description and claims directed to the presented invention, various terms may be used for which the following definitions will apply:

Electro-wetting on Dielectric or EWOD: as used herein refers to a class of devices or a class of portions of devices where a combination of immiscible fluids or liquids, a surface region with defined surface free energy and an electro-potential field are present. Typically, the electro-potential field will alter the surface free energy of the surface region, which may alter the interaction of the immiscible fluids with the surface region.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to a device or layer that is capable of supplying Energy or placing a logical or electrical device in an Energized state.

Energy Harvester: as used herein refers to a device capable of extracting energy from the environment and converting it to electrical energy.

Functionalized: as used herein refers to making a layer or device able to perform a function including for example, energization, activation, or control.

Leakage: as used herein refers to unwanted loss of energy.

Lens or Ophthalmic Device: as used herein refers to any device that resides in or on the eye. These devices may provide optical correction, may be cosmetic, or may provide functionality unrelated to the eye. For example, the term lens may refer to a contact lens, intraocular lens, overlay lens, ocular insert, optical insert, or other similar device through which vision is corrected or modified, or through which eye physiology is cosmetically enhanced (e.g. iris color) without impeding vision. Alternatively, the Lens may provide non-optic functions such as, for example, monitoring glucose or administrating medicine. In some embodiments, the preferred lenses of the invention are soft contact lenses are made from silicone elastomers or hydrogels, which include, for example, silicone hydrogels, and fluorohydrogels.

Lens-forming mixture or Reactive Mixture or Reactive Monomer Mixture (RMM): as used herein refers to a monomer or prepolymer material that may be cured and crosslinked or crosslinked to form an ophthalmic lens. Various embodiments may include lens-forming mixtures with one or more additives such as, for example, UV blockers, tints, photoinitiators or catalysts, and other additives one might desire in an ophthalmic lenses such as, contact or intraocular lenses.

Lens-forming Surface: as used herein refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens-forming surface can have a geometry that is necessary to impart to the lens surface the desired optical characteristics, including without limitation, spherical, aspherical and cylinder power, wave front aberration correction, corneal topography correction and the like as well as any combinations thereof.

Light Modulating Element as used herein refers to a device or portion of a device that modulates the intensity of light transmitting from one side to another. The ideal light modulating elements in embodiments herein will transmit all light in one state and no light in another. Practical elements may substantially achieve the ideal aspects.

Lithium Ion Cell: as used herein refers to an electrochemical cell where Lithium ions move through the cell to generate electrical energy. This electrochemical cell, typically called a battery, may be reenergized or recharged in its typical forms.

Media Insert: as used herein refers to an encapsulated insert that will be included in an energized ophthalmic device. The energization elements and circuitry may be incorporated in the Media Insert. The Media Insert defines the primary purpose of the energized ophthalmic device. For example, in embodiments where the energized ophthalmic device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: as used herein refers to a rigid or semi-rigid object that may be used to form lenses from uncured formulations. Some preferred molds include two mold parts forming a front curve mold part and a back curve mold part.

Operating Mode: as used herein refers to a high current draw state where the current over a circuit allows the device to perform its primary energized function.

Optical Zone: as used herein refers to an area of an ophthalmic lens through which a wearer of the ophthalmic lens sees.

Photonic Emitter: as used herein refers to a device or device portion that may receive incident light and transmit that light into free space. The light may typically proceed in an altered direction than that incident upon the emitter. The Emitter may typically comprise an antenna structure to transmit the light.

Pixel Based Light Modulation System: as used herein refers to a combination of light modulating elements that function individually wherein each individually function portion of the light modulation system may be considered a pixel or picture element.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate and for a certain, reestablished period.

Reenergize or Recharge: as used herein refers to restoring to a state with higher capacity to do work. Many uses within this invention may relate to restoring a device to the capability to flow electrical current at a certain rate and for a certain, reestablished period.

Reference: as use herein refers to a circuit which produces an, ideally, fixed and stable voltage or current output suitable for use in other circuits. A reference may be derived from a bandgap, may be compensated for temperature, supply, and process variation, and may be tailored specifically to a particular application-specific integrated circuit (ASIC).

Released from a Mold: as used herein refers to a lens is either completely separated from the mold, or is only loosely attached so that it may be removed with mild agitation or pushed off with a swab.

Reset Function: as used herein refers to a self-triggering algorithmic mechanism to set a circuit to a specific predetermined state, including, for example, logic state or an energization state. A Reset Function may include, for example, a power-on reset circuit, which may work in conjunction with the Switching Mechanism to ensure proper bring-up of the chip, both on initial connection to the power source and on wakeup from Storage Mode.

Sleep Mode or Standby Mode: as used herein refers to a low current draw state of an energized device after the Switching Mechanism has been closed that allows for energy conservation when Operating Mode is not required.

Stacked: as used herein means to place at least two component layers in proximity to each other such that at least a portion of one surface of one of the layers contacts a first surface of a second layer. In some embodiments, a film, whether for adhesion or other functions may reside between the two layers that are in contact with each other through said film.

Stacked Integrated Component Devices or SIC Devices: as used herein refers to the products of packaging technologies that assemble thin layers of substrates that may contain electrical and electromechanical devices into operative-integrated devices by means of stacking at least a portion of each layer upon each other. The layers may comprise component devices of various types, materials, shapes, and sizes. Furthermore, the layers may be made of various device production technologies to fit and assume various contours.

Storage Mode: as used herein refers to a state of a system comprising electronic components where a power source is supplying or is required to supply a minimal designed load current. This term is not interchangeable with Standby Mode.

Substrate Insert: as used herein refers to a formable or rigid substrate capable of supporting an Energy Source within an ophthalmic lens. In some embodiments, the Substrate insert also supports one or more components.

Switching Mechanism: as used herein refers to a component integrated with the circuit providing various levels of resistance that may be responsive to an outside stimulus, which is independent of the ophthalmic device.

Energized Ophthalmic Device

Proceeding to FIG. 1, an exemplary embodiment of a Media Insert 100 for an energized ophthalmic device and a corresponding energized ophthalmic device 150 are illustrated. The Media Insert 100 may comprise an Optical Zone 120 that may or may not be functional to provide vision correction. Where the energized function of the ophthalmic device is unrelated to vision, the Optical Zone 120 of the Media Insert 100 may be void of material. In some embodiments, the Media Insert 100 may include a portion not in the Optical Zone 120 comprising a substrate 115 incorporated with energization elements 110 and electronic components 105. There may be numerous embodiments relating to including Photonic Emitters into ophthalmic devices.

In some embodiments, a power source 110, which may be, for example, a battery, and a load 105, which may be, for example, a semiconductor die, may be attached to the substrate 115. Conductive traces 125 and 130 may electrically interconnect the electronic components 105 and the energization elements 110. The Media Insert 100 may be fully encapsulated to protect and contain the energization elements, traces, and electronic components. In some embodiments, the encapsulating material may be semi-permeable, for example, to prevent specific substances, such as water, from entering the Media Insert 100 and to allow specific substances, such as ambient gasses or the byproducts of reactions within energization elements, to penetrate or escape from the Media Insert 100.

In some embodiments, the Media Insert 100 may be included in an ophthalmic device 150, which may comprise a polymeric biocompatible material. The ophthalmic device 150 may include a rigid center, soft skirt design wherein a central rigid optical element comprises the Media Insert 100. In some specific embodiments, the Media Insert 100 may be in direct contact with the atmosphere and the corneal surface on respective anterior and posterior surfaces, or alternatively, the Media Insert 100 may be encapsulated in the ophthalmic device 150. The periphery 155 of the ophthalmic Lens 150 may be a soft skirt material, including, for example, a hydrogel material.

The infrastructure of the media insert 100 and the ophthalmic device 150 may provide an environment for numerous embodiments involving light projection with Photonic Emitters, which may be combined with active or non-active lens devices and in some embodiments with light intensity modulating arrays. Some of these embodiments may involve purely passive function of the portion of the ophthalmic device not related to the photonic projection components. Other embodiments, may involve the ophthalmic device having active functions that may complement or supplement the function of the photonic projection components. For example, the non-projection portions of the device may provide vision correction or active "screening" of the device such that its transparency to incident light is reduced.

Figure 2:
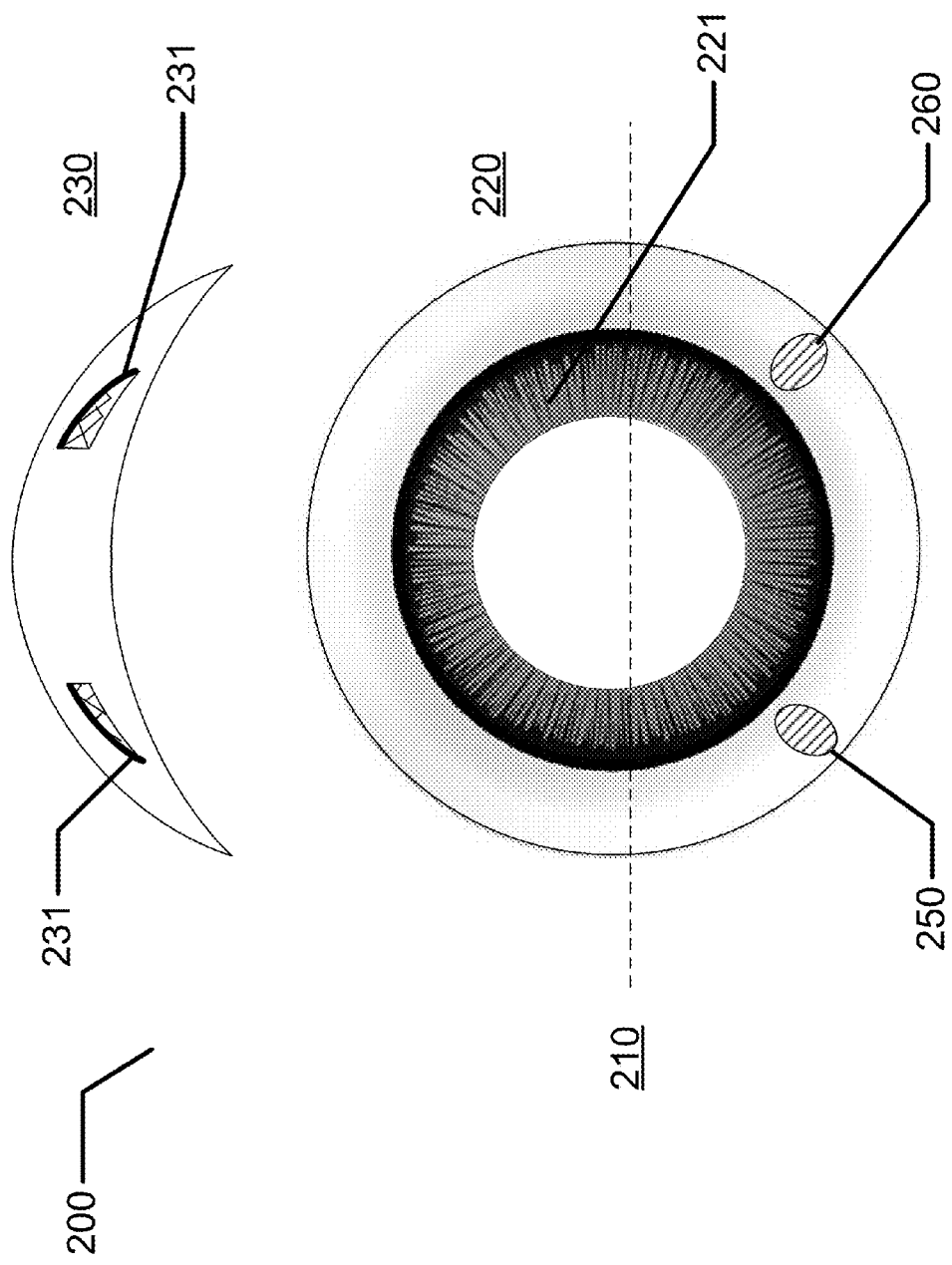
FIG. 2 illustrates an exemplary contact lens with various features including an incorporated annular multi-piece insert that may be useful for implementing aspects of the art herein.

Proceeding to FIG. 2, item 200 a depiction of an exemplary multi-piece insert may be illustrated in cross section. The insert of this type is an annular insert with a ring of material around a central optical zone that is devoid of material. In FIG. 2, the ophthalmic device, 220, may have a cross sectional representation, 230, which represents a cross section through the location represented by line 210. In an exemplary embodiment, the region of the insert outside the optic zone of the ophthalmic device may include energization elements and controlling electronics to support active elements of various kinds. These active elements may typically include sensors and communication elements of various types. Alternatively, in some embodiments of the inventive art herein may provide the control and energization function for a projection element based upon photonic projection elements. As well, outside the optic zone of the device there may be printed patterns placed on the insert as shown by item 221 and in cross section as items 231.

In some embodiments, there may be a requirement for orientation of the ophthalmic lens within the ocular environment. Items 250 and 260 may represent stabilization zone features that can aid in orienting the formed ophthalmic lens upon a user's eye. Moreover, in some embodiments the use of orientation features upon the multi-piece annular insert may allow for its orientation relative to the molded stabilization features, which may be particularly important for placements of projection elements and lens systems that do not have dynamic focus and centering controls.

Figure 3:
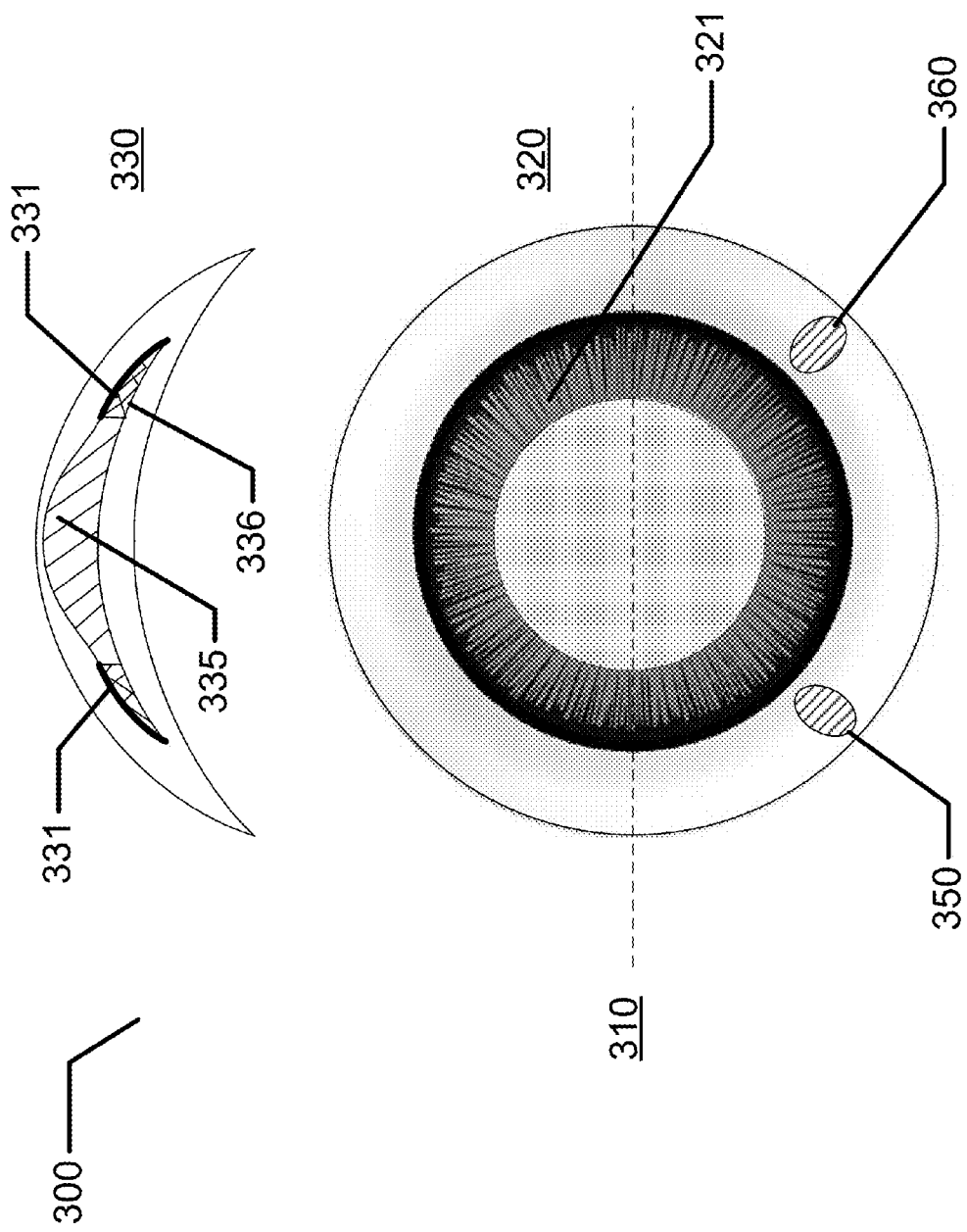
FIG. 3 illustrates an exemplary alternative embodiment to that demonstrated in FIG. 2 wherein the insert comprises material in the optical zone.

Proceeding to FIG. 3, item 300 a variation of the exemplary multi-piece insert shown in FIG. 2 may be illustrated in cross section. In FIG. 3, the ophthalmic device, 320, may have a cross sectional representation, 330, which represents a cross section through the location represented by line 310. In an exemplary embodiment, the optic zone of the ophthalmic device 320 may include a portion where an active focal adjusting lens system such as a liquid meniscus based lens system 335 may be found. As well, outside the optic zone of the device there may be portions of the insert that contain energization elements and control and activation components at 336. For similar motivations as the embodiment in FIG. 2, there may be alignment features or stabilization zones incorporated into the ophthalmic device as shown as items 350 and 360, and there may be patterns printed upon the insert as features 331.

Photonic Projection Elements

Figure 4:
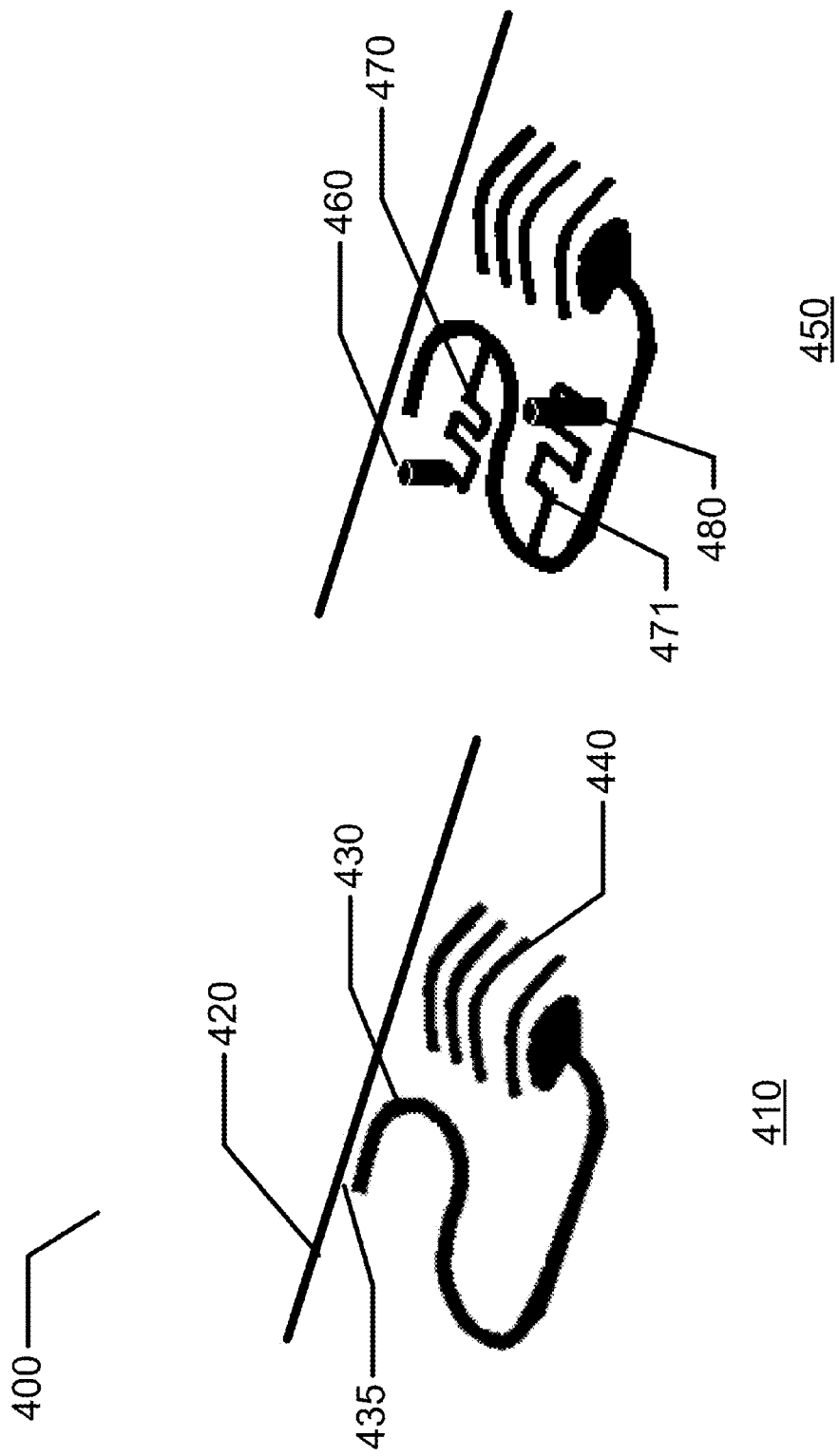
FIG. 4 illustrates exemplary Photonic Emitter structures consistent with structures described in the state of the art elsewhere, which may be useful for implementing aspects of the art herein.

Proceeding to FIG. 4, item 400 Photonic Emitters are displayed. There may be numerous manners of defining emitter (which may also be considered radiator) elements for use with photonic applications. In 400, item 410 demonstrates a simple Photonic Emitter element consistent with some definitions described in the state of the art. The source of the photons for the system may be a light pipe 420 that runs parallel to coupling portions 430 of the radiator element. Photons travelling through the light pipe 420 may couple to the coupling portions 430 by a process which may be called evanescent coupling; an exponentially decaying phenomena in the near region to the periphery of the light pipe. The coupling will allow photons to move from the light pipe to the radiator element. The degree of the coupling and therefore the number of photons that enter the radiator element, which is a type of intensity, may be modulated by a number of phenomena such as the materials used, the ambient conditions but more importantly the structural design of the system. The length of the parallel portion of item 430 and the gap between this region and the light pipe, 435 may dominate the efficiency of coupling and can be used to adjust the nominal relative intensity of a Photonic Emitter in a collection of Photonic Emitters. In item 410, the light will proceed through the element's light guiding components, 430 until it reaches the radiator portion shaped in a diffraction grating. Numerous effects can be exploited to increase the efficiency of light through the Photonic Emitter, as for example the constructed angle of the emission surfaces and their shape and gap dimension. Ideally as much light as possible will be emitted at 440 in one direction, for example "out of the page."

At 450, a more sophisticated Photonic Emitter may be found. A heating mechanism may be incorporated into the emitter cell. It may be comprised of a resistive heater built into the Photonic Emitter. In embodiments, where the emitter is formed in semiconducting materials, like silicon, the resistor may be formed in the same layer where it may be doped to alter resistivity characteristics. By flowing a current from a contact 480, through a resistive arm 470, and through a portion of the emitter body 430 and back through another portion of the resistive arm 471 and through a contact 460, the Photonic Emitter may have a portion of the light path differentially heated. Thermal effects in light pipes such as that of item 430 may alter the phase characteristics of the light that travels through them. Thus, the Photonic Emitter of item 450 may have a certain intensity of light emitted from it based on the intensity in the source light pipe 420 and the efficiency of coupling of source light into the emitter device based on the proximity of a coupling region of the emitter device and the dimensions of that coupling region. Moreover, in addition the phase of that light may be controllably altered based on the application of an electrical current through the heater portion between item 460 and 480. Control of the relative phase of emitted light in such a manner may result in the effective transmission of information encoded in the phase characteristics being observable in the far field image of an array built with such Photonic Emitters where the phase of individual pixels may be controlled by the thermal state imposed on portions of the emitter device. There may be numerous materials that such a Photonic Emitter may be constructed in and there may be numerous means for different materials to introduce phase effects including thermal controls and mechanical stress controls as non-limiting examples.

Figure 5:
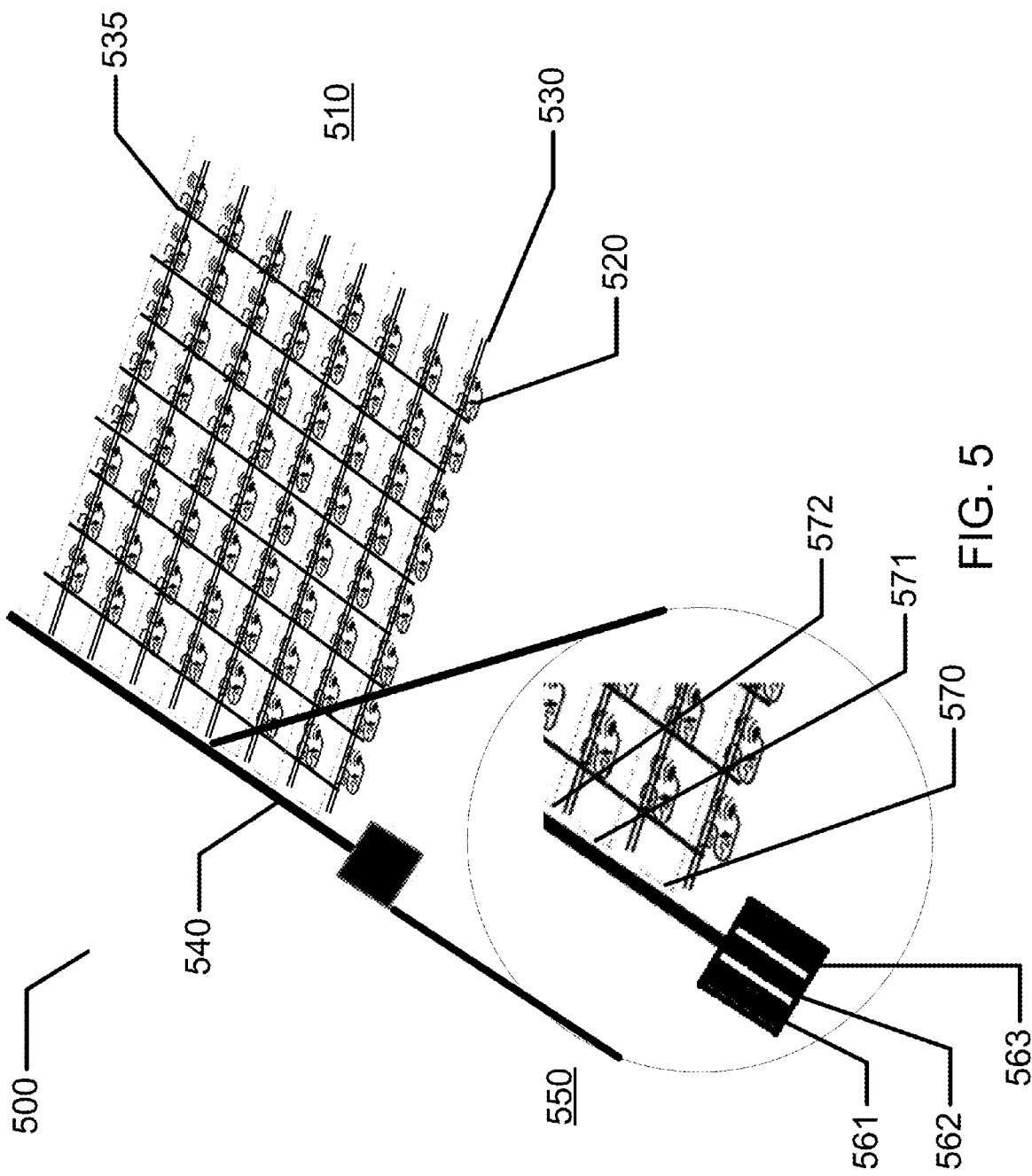
FIG. 5 illustrates an array structure of Photonic Emitters with a light source and means of coupling the light source to the array.

Proceeding to FIG. 5, item 500 an exemplary array constructed from Photonic Emitters is depicted. In some embodiments, the Photonic Emitter pixel 520 may be defined in a similar fashion to the elements at 410 or 450. In item 500, the cells are depicted of the type in item 450. Light is supplied from a light source 540 that may in some embodiments be comprised of one or more laser elements emitting light into one or more supply light pipes for the Photonic Emitter array. Electrical current flowing through the heated portions of a pixel 520 may be introduced by conductive metal lines built into the Photonic Emitter in similar fashions to the metal lines in an integrated circuit. A set of word lines 530 may have corresponding bit lines 535 to allow the addressing of individual cells in an efficient fashion. In some embodiments, the photonic array may be built into the silicon substrate useful to construct control electronics for the array itself. The exemplary pixel elements such as 520 may have a dimension about 9 microns by 9 microns or smaller. Thus, an array of 64×64 emitters may have a scale of roughly 0.5 mm by 0.5 mm in size. The actual dimensions of the pixels may vary in a matrix and may be different for different targeted wavelengths of emission.

In the inset 550 of item 500, a close up version of the light source and the supply light pipe or pipes, 540 may be shown. Light from a source, 561 may be guided into the light pipe. Along the dimension of the light pipe, additional distribution elements in the form of additional light pipes may be found. Items 570, 571 and 572 may demonstrate light pipes coupled into the main supply light pipe and running roughly perpendicular to distribute light to rows of Photonic Emitters. The design aspects of the pipes and the individual pixel elements along the row may be optimized for each element so that a particular intensity pattern along the row and in the array may be obtained. In a preferred example, the array may be designed such that the resulting emission intensity from each pixel is approximately the same for all elements.

In some embodiments, multiple light sources at different wavelengths may be used to impart light on a single source light pipe 540 or in some embodiments; the light pipe 540 may be comprised of multiple pipes. In the example, there may be three different light sources 561, 562 and 563. Where in a non-limiting example source 561 may comprise a red light source, source 562 may comprise a green light source and 563 may comprise a blue light source. There may be numerous types of sources of light consistent with the inventive art including solid state lasers, or solid state light emitting diodes, or filtered incandescent lamps as non limiting examples. In embodiments where the relative phase of the pixels in the array may be important for encoding information, the light source may be characterized by a desired coherence of the light output. Other embodiments may function with non-coherent light sources.

If there are multiple wavelengths provided in the supply source, the interaction of the rows of light pipes shown as item 570 may be controlled so that one light source is favored for a particular row. This may be controlled by the use of filtering materials in the region where the light pipe for a row 570 couples to the supply light pipe. Alternatively, if there are multiple supply light pipes, the pipes for the non-desired wavelengths for a particular light source may be blocked by absorbing material. There may be numerous materials that may be used to block the light coupling including metallic materials or the use of heavy doping levels in a semiconductor material.

In an alternative embodiment, the multiple light sources may have a duty cycle. They may be turned on or off for their turn to use the source light pipes. In such an embodiment, there may not be a need for either multiple source lines or controls to funnel different light sources to different regions of the array. However, the design of the Photonic Emitter pixel may have to be performed in such a manner that is not optimized for a particular wavelength but optimized for all wavelengths employed. In some embodiments, the pixel may be comprised by multiple emitters where one of the emitters may be optimized for a particular source.

Figure 6:
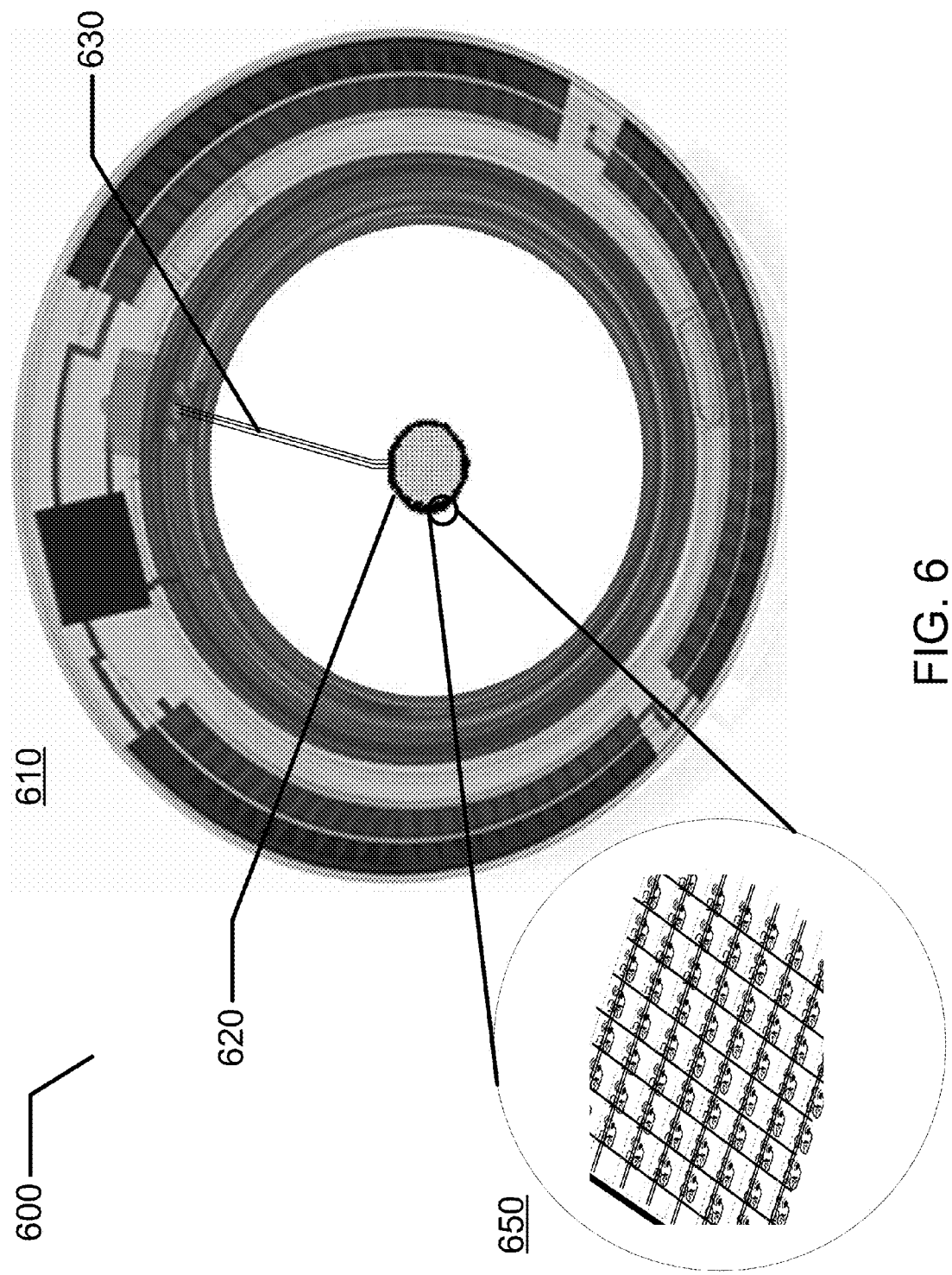
FIG. 6 illustrates an exemplary device comprising an array of Photonic Emitters within a portion of the optical zone of an exemplary ophthalmic device.

In the array of item 510 where the individual pixels include phase shifting components within their design, it may be useful to include lenses that allow for the focusing of the far field image of the array onto a particular point, which may include a user's retina. In a single light source embodiment, it may be important for coherent light to be used as the source. The resulting far field image may comprise an image constructed from the phase information within the individual pixels. An example of such an embodiment where a photonic array projecting far field phase controlled pixel images may be depicted in FIG. 6, item 600. An ophthalmic insert 610 as has been described, which may contain energization elements, and control circuitry may control electrical signals through an electrical bus 630. In some embodiments, this bus may be constructed of conductors with as little visible light absorbance characteristics as possible. For example, Indium Tin Oxide (ITO) may be an example. A projection system 620 may be located at the center of the optical zone and may comprise an array of Photonic Emitters as shown in item 650 along with control circuitry, light sources, and lensing elements to mention a few of the included components.

Figure 7:
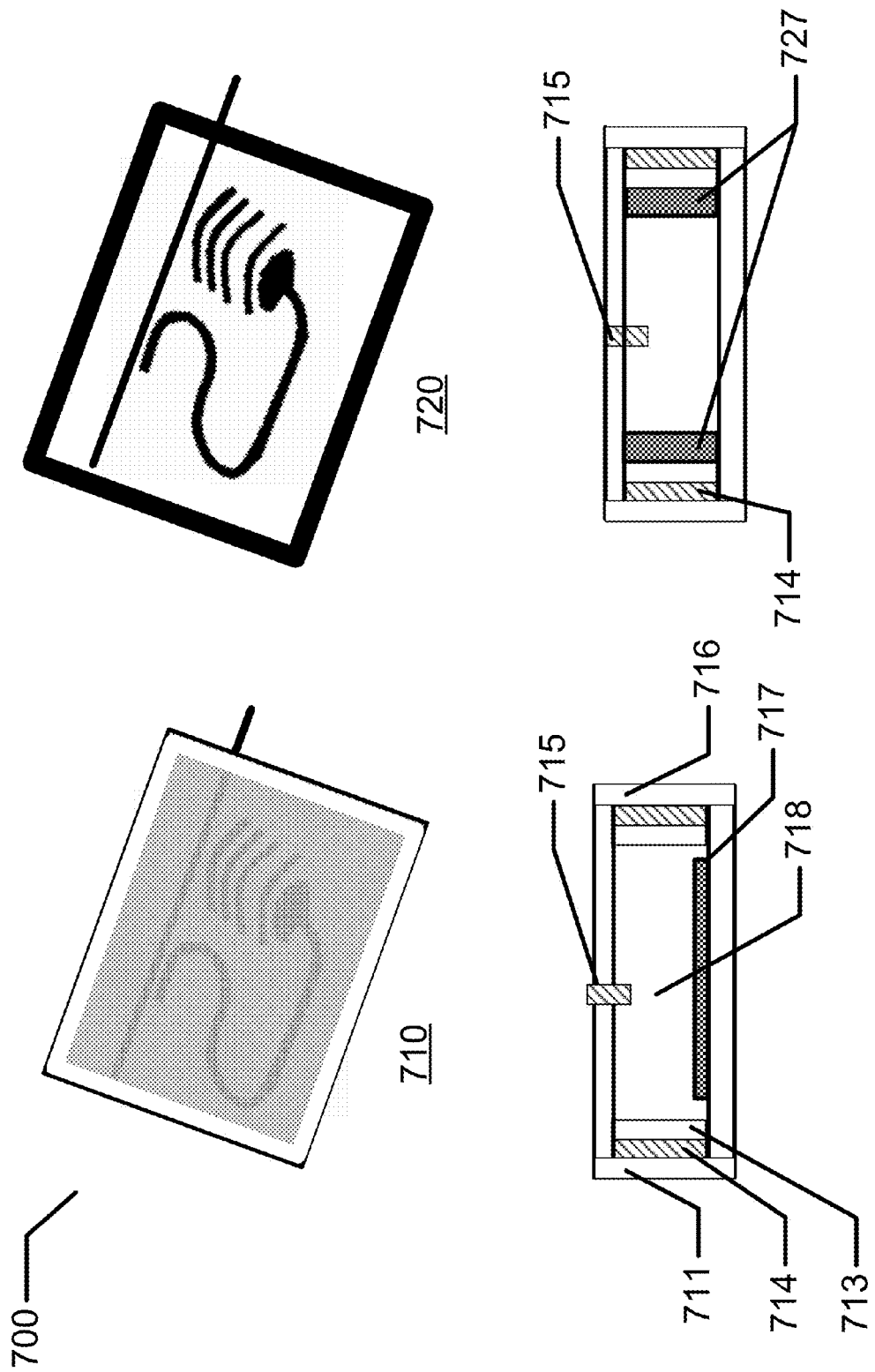
FIG. 7. Illustrates an exemplary light modulating element structure that may be useful for implementing aspects of the art herein.

An alternative embodiment may involve the use of the photonic array as an emitter of light where the phase characteristics are not the primary focus. Proceeding to FIG. 7, item 700 an example of a pixel element 720 utilizing the exemplary Photonic Emitter without incorporated heater may be found. In some embodiments, the incorporation of the heater may still be desirable, but for example, it is not depicted. If the near field image of the resulting array is focused on a particular position, the light source may be part of a projection system where each pixel has an element that controls the transmitted intensity that proceeds from the emitter to the user's retina. In FIG. 7, an example of a light intensity-controlling element aligned to each photonic emission element may be found.

The phenomena of Electro-wetting on Dielectrics may be used to control intensity transmitted on a pixel-by-pixel basis. The technique acts on combinations of liquids by changing the surface free energy of surfaces near the liquids. Combinations of immiscible liquids, where one liquid, for example is a polar liquid like an aqueous solution, and the other liquid is a non polar liquid like an oil may be effective for EWOD devices. One of these liquids may be formulated to be transparent to light in a particular desired wavelength regime whereas the other liquid may be opaque at those or all visible wavelengths. The liquid itself may have such properties, or the liquid may be combined with dying agents to result in the desired wavelength blocking effect. And, it may be possible to include different combinations of liquids with different inherent wavelength blocking capabilities in different pixel elements in the same device.

In an example embodiment, an oil based non-aqueous liquid may comprise a dying agent to render an effective absorbance in a layer of an EWOD pixel cell that may be considered a Light Modulating Element. In FIG. 7, item 710 may comprise a pixel element where the oil-based liquid is located across the pixel and absorbs significant quantities of light. There may be isolation structure 711 and 716 that define the edges of the pixel cell. The oil-based liquid may be that depicted as item 717 in the exemplary pixel based EWOD cell. A portion of the cell at item 713 may be coated with a material that has a surface free energy such that it may repel oil-based fluids. The aqueous fluid may be represented as item 718. Therefore in a standard non energized state, the fluids would prefer to assume a location where the dyed oil based phase is localized across the interior region of the pixel away from surface 713, and therefore in the light path of light proceeding through the pixel. A combination of electrodes 715 and 714 along with a dielectric underlying or comprising the material of surface 713 allows for an application of an electro-potential across the two immiscible liquids. By applying an electro-potential across the electrodes, the free energy of surface 713 may be altered to attract the oil-based liquid of item 717 to it as may be observed at 720. When the dyed fluid 717 is drawn to the sidewall region of the electrode as shown as 727 it is moved out of the optical path and the pixel becomes more transparent to light through it. This embodiment would therefore allow for the pixel-based control of light emanating from a Photonic Emitter to be passed on through. In some embodiments, this may allow for a projection system to be formed from a combination of an array of Photonic Emitters each with a corresponding pixel element comprising an electro-wetting on dielectric cell to control transmittance. These embodiments may also comprise a light source, control electronics for both the light source and the pixel elements, and a lens system to focus the near field image at a desired location, which may comprise a user's retina. There may be numerous alternatives to the electro-wetting on dielectric cell that may allow for the control of the transmittance of light near a Photonic Emitter. Additionally, the example provided of the electro-wetting on dielectric based cell may have numerous alternatives including for example the reversal of the type of fluid that may comprise a dye or an inherent quality to block light.

Figure 8:
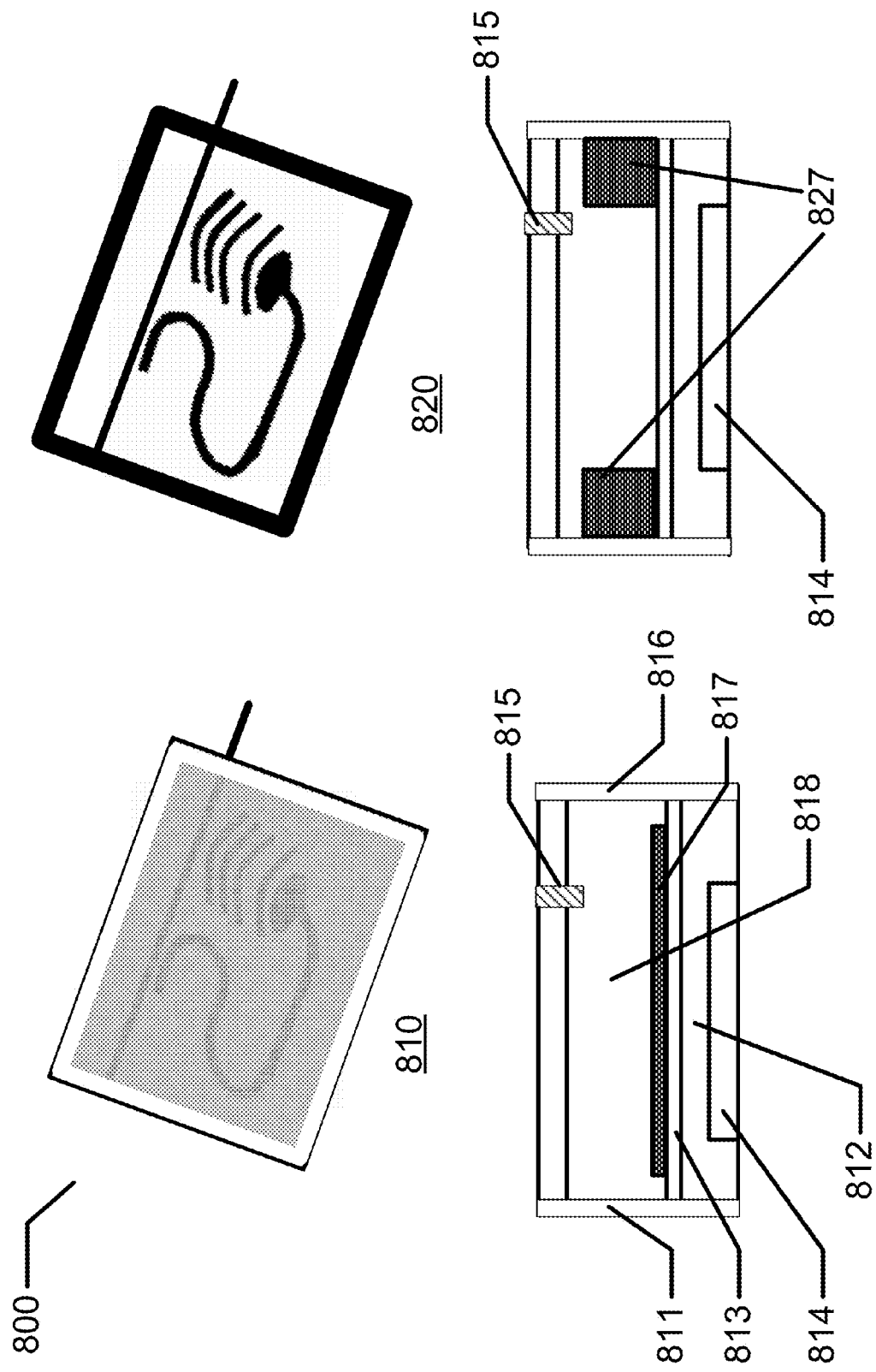
FIG. 8. Illustrates an alternative exemplary light modulating element structure that may be useful for implementing aspects of the art herein.

Proceeding to FIG. 8, item 800 an alternative embodiment of an EWOD pixel based light intensity-modulating cell is depicted. In this embodiment, the electrode in proximity to a surface along which a fluid will be attracted is not on the sidewall of a vertical structure but along one of the cell faces. Because the device may operate with light proceeding through this surface, the use of relatively transparent electrodes is important in such embodiments. As mentioned in previous discussions, the use of ITO as the material for the electrode may be an acceptable solution. As well, there may be modifications that allow the electrode to be located on the periphery of the EWOD cell face as well. Nevertheless, in FIG. 8, item 810 may represent a cell where the light absorbing material is blocking the majority of the cell surface. Item 817 may represent a fluid with an absorbing characteristic this is either inherent or results from the use of dyes. Item 818 may represent the other fluid that may not significantly interact with light through the cell. Item 813 may represent a surface which has a defined surface free energy which may be either inherent or may result from processing designed to establish a surface characteristic. Item 812 may be an optional layer of dielectric material that may be present if item 813 is created either as an additional film upon a dielectric or as a surface modification of a dielectric. Item 814 may be an electrode useful in defining the region of the dielectric surface that is affected when an electro-potential is applied across the EWOD cell. Items 811 and 816 may be the structural containment that is used to define pixels. When an electro-potential is applied across the cell at points 814 and 815, the state of the cell may be as depicted in item 820. By causing the light absorbing fluid to be repelled in the region of the surface above the electrode 814, the fluid moves to the edge of the pixel element as shown by 827 on the cell depiction. Therefore, it is moved out of the optical path and the pixel becomes more transparent to light through it.

Energized Ophthalmic Devices with Photonic Emitters

Proceeding to FIG. 9, item 900 an embodiment that incorporates many of the discussed aspects of a Photonic based imaging system is displayed. Item 910 may be an ophthalmic device capable of being worn on a user's eye surface. It may be formed of a hydrogel-based skirt 911 that completely surrounds in some embodiments, or partially surrounds or supports an insert device in other embodiments. In the depiction, the skirt 911 surrounds a fundamentally annular insert device 936. Sealed within the insert device 936 may be energization elements, electronic circuitry for control, activation, communication, processing and the like. The energization elements may be single use battery elements or rechargeable elements along with power control systems, which enable the recharging of the device. The components may be located in the insert device as discrete components or as stacked integrated devices with multiple active layers.

The ophthalmic device may have structural and cosmetic aspects to it including, stabilization elements 950 and 960 which may be useful for defining orientation of the device upon the user's eye and for centering the device appropriately. The fundamentally annular device may have patterns printed upon one or more of its surfaces depicted as an iris pattern item 921 and in the cross section 930, along the line 915, as items 931.

The insert device may have a photonic-based imaging system in a small region of the optical zone as shown as item 940. As mentioned previously, in some embodiments a 64×64 pixel imaging system may be formed with a size roughly 0.5 mm×0.5 mm in size. In cross section, it may be observed that item 940 may be a photonic projection component that may comprise photonic emitter elements; an EWOD based pixel transmittance control device, a light source or multiple light sources and electronics to control these components. The photonic-based imaging system may be attached to a lens system 950 and be connected to the annular insert component by a data and power interconnection bus 941.

In some embodiments, the lens system may be formed of static lens components that focus the near field image of the imaging system to a fixed location in space related to the body of the ophthalmic device. In other embodiments, the lens system may also include active components. For example, a meniscus based lens device with multiple electrode regions may be used to both translate the center of the projected image and adjust the focal power of the device to adjust the focus and effectively the size of the image projected. The lens device may have its own control electronics or alternatively it may be controlled and powered by either the photonic-based imaging component or the annular insert device or both.

In some embodiments, the display may be a 64×64 based projection system, but more or less pixels are easily within the scope of the inventive art, which may be limited by the size of the pixel elements and the ophthalmic device itself. The display may be useful for displaying dot matrix textual data, image data or video data. The lens system may be used to expand the effective pixel size of the display in some embodiments by rastering the projection system across the user's eye while displaying data. The display may be monochromatic in nature or alternatively have a color range based on multiple light sources. Data to be displayed may be communicated to the ophthalmic lens from an outside source, or data may originate from the ophthalmic device itself from sensors, or memory components for example. In some cases data may originate both from external sources with communication and from within the ophthalmic device itself.

The invention claimed is:

1. An ophthalmic device comprising:
    at least a one light source that emits light;
    at least one photonic emitter that emits at least some of the light received from the light source;
    an electronic component that applies an electrical potential to the light source; and
    an energization element that energizes at least the electronic component, wherein the energization element has a size and a shape such that it occupies a position between an eye-lid and the surface of an eye.

2. The ophthalmic device of claim 1 wherein:
    the photonic emitter is comprised of a semiconducting material.

3. The ophthalmic device of claim 2 wherein:
    the semiconducting material comprises silicon.

4. The ophthalmic device of claim 3 wherein:
    the photonic emitter additionally comprises a resistive heating element.

5. The ophthalmic device of claim 1 wherein:
    the light source comprises a light emitting diode.

6. The ophthalmic device of claim 1 wherein:
    the light source comprises a laser.

7. The ophthalmic device of claim 1 additionally comprising:
    a pixel based light modulating system.

8. The ophthalmic device of claim 7 wherein:
    the pixel based light modulation system comprises a surface region that is free of energy and capable of being altered by the application of an electropotential field.

9. The ophthalmic device of claim 8, wherein:
    the pixel based light modulation system comprises a meniscus based lens.

10. The ophthalmic device of claim 1 wherein:
    the at least one photonic emitter receives light via evanescent coupling.

11. The ophthalmic device of claim 1 further comprising:
    a light pipe optically coupled to the at least one light source.

12. The ophthalmic device of claim 11, wherein:
    the at least one photonic emitter comprises a light receiving portion which runs parallel to the light pipe.

13. The ophthalmic device of claim 12, wherein:
    the at least one photonic emitter comprises a radiator portion shaped in a diffraction grating.

14. The ophthalmic device of claim 1 wherein:
    light from the photonic emitter proceeds in an altered directed than that incident upon the photonic emitter.

15. The ophthalmic device of claim 1 wherein:
    the photonic emitter further comprises an antenna structure to transmit light.

* * * * *